United States Patent
Sarkar et al.

(10) Patent No.: US 6,917,587 B1
(45) Date of Patent: Jul. 12, 2005

(54) METHOD AND APPARATUS FOR RECOVERING A CALL RESOURCE FROM A CALL SESSION

(75) Inventors: Shantanu Sarkar, San Jose, CA (US); Shmuel Shaffer, Palo Alto, CA (US); Thiyagesan Ramalingam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 794 days.

(21) Appl. No.: 09/776,076

(22) Filed: Feb. 1, 2001

(51) Int. Cl.[7] .............................................. G01R 31/08
(52) U.S. Cl. .................................... 370/230; 370/431
(58) Field of Search .............................. 370/252, 230, 370/241–8, 259, 260–7, 395.1, 395.2, 431, 433, 437, 449

(56) References Cited

U.S. PATENT DOCUMENTS

| | | | |
|---|---|---|---|
| 5,959,662 A | * | 9/1999 | Shaffer et al. ............ 348/14.08 |
| 6,141,533 A | * | 10/2000 | Wilson et al. ............. 455/11.1 |
| 6,259,785 B1 | | 7/2001 | Shaffer et al. .............. 379/265 |
| 6,526,131 B1 | * | 2/2003 | Zimmerman et al. .. 379/106.09 |
| 2001/0043568 A1 | * | 11/2001 | McHale et al. ............. 370/254 |
| 2002/0064169 A1 | * | 5/2002 | Gummalla et al. ......... 370/412 |

* cited by examiner

*Primary Examiner*—David Vincent
(74) *Attorney, Agent, or Firm*—Baker Botts L.L.P.

(57) ABSTRACT

A method and apparatus for recovering a call resource from a call session are disclosed. A call resource detects if a media stream communicated from a device via a communication network becomes inactive during the call session and deletes the inactive media stream. The call resource deletes the inactive media streams until one media stream remains in the call session, which is terminated to release the call resource from the call session.

48 Claims, 3 Drawing Sheets

METHOD AND APPARATUS FOR RECOVERING A CALL RESOURCE FROM A CALL SESSION

TECHNICAL FIELD OF THE INVENTION

This invention relates in general to packet-based communication networks, and more particularly to a method and apparatus for recovering a call resource from a call session.

BACKGROUND OF THE INVENTION

Transcoding and conferencing sessions may occur over packet-based networks and may allow for the collaboration of video, audio and data. These sessions are executed by processors, such as digital signal processors, which create, modify and terminate media streams communicated to devices participating in the sessions. The processors act as media gateways, and thus have no direct knowledge of signaling to the devices. Signaling and control functions for the sessions are typically provided by a conference controller. If the conference controller crashes or otherwise loses contact with the session, the processors conducting the session lose the ability to receive signaling and in some signaling protocols the conference call may become unmanaged.

SUMMARY OF THE INVENTION

In accordance with the teachings of the present invention, the disadvantages and problems associated with recovering a call resource from a call session have been substantially reduced or eliminated. In a particular embodiment, a method for recovering a call resource from a call session is disclosed that deletes a media stream from a call session if the media stream is inactive and terminates the call session to reclaim the call resource if one media stream remains in the call session.

In accordance with one embodiment of the present invention, a method for recovering a call resource from a call session includes detecting if a media stream communicated from a device to a call resource via a communication network becomes inactive during a call session. The media stream is deleted if it is inactive and the steps of detecting and deleting are repeated until one media stream remains in the call session. The call resource is released from the call session when the one media stream is terminated.

In accordance with another embodiment of the present invention, a call resource includes a network port for communicating media streams between a plurality of devices in a call session. A media processor coupled to the network port conducts the call session. A controller coupled to the network port releases the media processor if a call manager becomes unavailable and one device remains as a participant in the call session.

In accordance with a further embodiment of the present invention, a communication system includes a plurality of devices, a call manager and a call resource coupled to a packet-based network. The call manager manages a call session between the plurality of devices. The call resource exchanges media streams between the devices participating in the call session, and terminates the call session if the call manager becomes unavailable and one device remains as a participant in the call session.

Important technical advantages of certain embodiments of the present invention include the ability to reclaim a call resource for use in another call session if a call manager loses contact with the call resource. The call resource detects if a media stream in the call session becomes inactive after losing contact with the call manager and deletes the inactive media stream from the session. When one media stream remains active in the call session, the call resource notifies the user at an endpoint of the active media stream and recovers the call resource from the call session. The call resource, therefore, may execute other call sessions initiated by another available or backup call manager.

Another important technical advantage of certain embodiments of the present invention includes the ability to maintain transcoding or conferencing sessions after a call manager loses contact with a call resource. Although the call resource has no knowledge of signaling to devices participating in the session after losing contact with the call manager, the call resource continues to exchange media streams between the devices until the call resource detects that one stream remains active in the call session.

A further important technical advantage of certain embodiments of the present invention includes the ability to terminate a call session if a user puts the call session on hold and there is a continuous audio stream (e.g., music on hold) playing for that endpoint. A call resource conducting the call session starts a timer when a call manager loses contact with the call resource. When the timer expires, the call resource determines if the remaining media streams have been put on hold by the user and deletes the remaining media streams to terminate the call session.

Other technical advantages will be readily apparent to one skilled in the art from the following figures, descriptions, and claims.

DETAILED DESCRIPTION OF THE INVENTION

Figure 1:
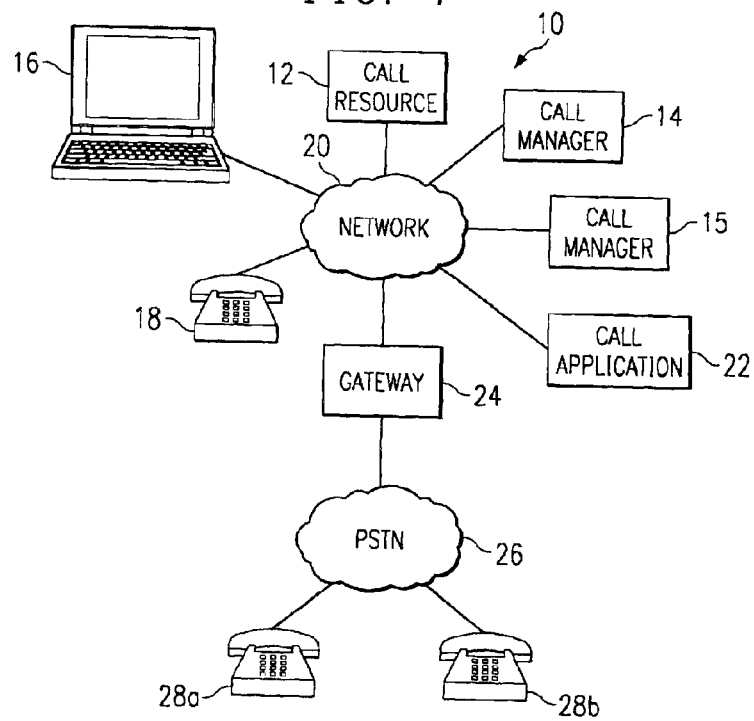
FIG. 1 illustrates a communication network in accordance with one embodiment of the present invention.

FIG. 1 illustrates a block diagram of a communication system 10 that supports the recovery of a call resource from a call session. System 10 includes call resource 12, call managers 14 and 15, and devices 16, 18 and 22 (generally referred to as devices 16) coupled to network 20. In a particular embodiment, if call manager 14 loses contact with call resource 12, call resource 12 operates to detect and delete inactive media streams communicated from devices 16. If one active media stream remains in the call session, call resource 12 deletes the one media stream and terminates the call session. Call resource 12, therefore, becomes available to be used for another call session initiated by call manager 15. Throughout this description, call session refers to any exchange of signaling and/or media between one or more devices 16, call managers 14, and/or call resources 12.

Network 20 may be a local area network (LAN), a wide area network (WAN), the Internet or other similar network that transmits packets of voice, video, data, and other information (generally referred to as media). In a particular embodiment, network 20 may be an Internet Protocol (IP) network. However, network 20 may be any type of network that allows transmission of audio and video telecommunication signals, as well as traditional data communications. Therefore, although subsequent description will primarily focus on IP communications, it should be understood that other appropriate methods of transmitting media over a network, such as a Frame Relay, Asynchronous Transfer Mode (ATM), or other packet-based network, are also included within the scope of the present invention.

Network 20 may be coupled to other IP networks and may communicate media between devices 16, and other devices located on different, but interconnected, IP networks. Network 20 may also be coupled to non-IP communication networks through gateway 24. In the illustrated embodiment, network 20 couples to a public switched telephone network (PSTN) 26. In alternative embodiments, network 20 may couple to a private branch exchange (PBX), a wireless network or any other non-IP communication network. Gateway 24 may digitize a telephone or data signal communicated by devices 28 from PSTN 26 if it is not already digitized, compress the digitized signal and route it to a destination over network 20 in packet form. Gateway 24 may also convert packets of data into telephone or data signals that may be transmitted across PSTN 26 to devices 28. Gateway 24 may further perform functions similar to devices 16 and it is contemplated that later references to devices 16 may include gateway 24.

IP networks and other packet-based networks typically transmit media by placing the data in cells, packets, frames, or other portions of information (generally referred to as packets) and sending each packet individually to the selected destination. Unlike a circuit-switched network, such as the PSTN, dedicated bandwidth is not required for the duration of a call session using network 20. Instead, devices 16 may send packets across network 20 as network 20 becomes available for transmission. This feature makes bandwidth available for additional communications when devices 16 are not communicating media.

The technology that allows voice media in particular to be transmitted over a packet-based network may be referred to as Voice over Packet (VoP) Devices 16 may have the capability to encapsulate a user's voice or other content into packets so that the content may be transmitted over network 20. Devices 16 may, for example, include cordless or cellular telephones, personal digital assistants (PDAs), or other wireless devices. Also, devices 16 may include telephony software running on a computing device, traditional plain old telephone (POTS) devices, analog phones, digital phones, IP telephony devices, or other computing and/or communication devices that communicate media using analog and/or digital signals.

Devices 16 may include a hold capability or other functionality that allows a user at devices 16 to suspend participation in the call session. Devices 16 may play audio or transmit silence when the call session to devices 16 is suspended, parked, transferred or otherwise placed on hold. Audio may include a recorded audio segment, music on hold, a radio broadcast, or any other audio content.

System 10 also includes call managers 14 and 15 (generally referred to as call managers 14) that manage the overall establishment of call sessions in system 10. Call managers 14 may be configured in a cluster, group or other suitable arrangement for scalability and redundancy in case one of call managers 14 becomes unavailable to manage a call session. Call managers 14 are applications that control call processing, routing, telephone features and options (such as call hold, call transfer, call waiting, and caller ID), device configuration, and other functions and parameters within network 20. Call managers 14 may control one or more of devices 16 coupled to network 20 and may also control devices located on other networks communicating with network 20. Call managers 14 may be implemented as hardware and/or software executing on one or more computers coupled to network 20. The call manager software or logic may be embodied in any type of medium including, but not limited to, hard drives, diskettes, CD-ROMs, DVD-ROMs, optical or magnetic media, field programmable arrays (FPGAs), embedded processors, or any other suitable media.

Call resource 12 coupled to network 20 includes multiple media processors to exchange and mix media streams associated with devices 16 participating in a call session over network 20. Each media processor may execute at least one call session. In one embodiment, call resource 12 receives media streams from devices 16 encodes, decodes, and/or transcodes the media stream into a proper format using at least one of the media processors, and generates a number of mixed media streams for communication back to devices 16. Devices 16 may exchange packets of media with call resource 12 for presentation to conference participants.

In system 10, signaling to and from devices 16 during a call session is first passed through call managers 14. Signaling between devices 16 and call managers 14 may be performed using any appropriate standards-based or proprietary signaling method. Call managers 14 may provide signaling for the call session and may instruct call resource 12 to establish media streams and mixed media streams for devices 16.

Call manager 14 may lose contact with the call session due to malfunction, network problems, or other circumstance. As a result, call resource 12 loses the ability to receive signaling for the call session. In some signaling protocols, such as the current implementation of H.323, loss of contact with call manager 14 results in immediate termination of the call session. This is undesirable since the call session may continue without call manager 14 or by replacing the signaling function with another call manager 15. This automatic termination of call sessions upon loss of signaling from call manager 14 decreases the reliability and availability in system 10. Other protocols may not disconnect the call upon loss of contact with call manager 14 due to specific protocol implementation, intermediate gateways having insufficient disconnect supervision, or other circumstance that may result in a call session without suitable functionality to terminate inactive media streams. While these protocols allow call sessions to continue without signaling from call manager 14, call sessions should be properly terminated upon completion of the call session to reclaim call resource 12. Call sessions that have lost signaling from call manager 14 may be known as orphaned call sessions.

In order to properly maintain and terminate an orphaned call session, call resource 12 continues the call session but implements a variety of techniques to determine whether the media streams are active. Since two media streams are necessary to conduct a meaningful call session, call resource 12 terminates a call session having only one active media stream to reclaim call resource 12 for later call sessions.

In an orphaned call session including multiple media streams, a media stream may be considered to be inactive if the media stream indicates no voice or data activity for a specific amount of time. For example, the media stream may be inactive if call resource 12 stops receiving media or control packets from devices 16. In one embodiment, call resource 12 detects the inactivity on one or more of the media streams and sets a timer to record the length of time that no activity is indicated by each of the media streams.

When the timer expires, call resource 12 deletes the inactive media stream from the call session by deallocating the processing resources for the inactive media stream. Deleting an inactive media stream contemplates any processing or configuring performed by call resource 12 to deallocate, ignore, or otherwise reduce processing requirements for the inactive media stream. For example, call resource 12 may receive a packet associated with an inactive media stream, analyze its addressing information, and perform no further content processing upon confirming that the addressing information relates to an inactive media stream. Call resource 12 repeats the above process until only one media stream remains active in the call session.

A call session having one active media stream and no connectivity to an active call manager 14 leaves a caller at the endpoint of the active media stream without the ability to add participants to the session. Call resource 12, therefore, deletes the remaining active media stream to terminate the call session and reclaim the media processor in call resource 12 for use in another call session. In one embodiment, call resource 12 may notify a user at the endpoint of the one active media stream by playing a prompt indicating that the call session is being terminated.

In one embodiment, a user at device 16 places the call session on hold and call manager 14 sends a remote on hold notification to call resource 12 indicating that device 16 has been placed on hold. If call manager 14 subsequently loses contact with the call session, call resource 12 detects that a remote on hold notification was received for device 16 and deletes the media stream associated with device 16. Call resource 12 may delete the media stream associated with the remote on hold notification to reclaim processing resources associated with device 16.

In a further embodiment, users at devices 16 and 18 place the call session on hold. When call manager 14 loses contact with call resource 12, call resource 12 deletes any inactive media streams from the call sessions. Since the media streams communicated from devices 16 and 18 may contain audio such as music on hold, call resource 12 detects that two media streams are continuously and simultaneously active in the call session. In this case, call resource 12 may use a timer to terminate the call session. In one embodiment, call resource 12 starts the timer when call manager 14 loses contact with the call session. When the timer expires, e.g., after two or three hours, call resource 12 assumes that the call session has ended and terminates the two media streams communicated from devices 16 and 18.

In an alternative embodiment, call resource 12 plays a warning notification to users at endpoints of the active media streams after the timer expires. The notification prompts the users at the endpoints to respond. For example, the prompt may ask the user to say a certain word or phrase, e.g., "yes" or "yes, I'm active," or press a key on devices 16 in response to the prompt. In-band dual tone multifrequency (DTMF) signals may be used for this purpose. In one embodiment, call resource 12 detects if the user responded correctly to the prompt with an adaptive speech recognition (ASR) unit. The ASR unit performs adaptive speech recognition on the user response. If the user response matches a desired word or phrase, call resource 12 resets the timer and continues the call session. If the correct response is not received because the remaining media streams contain music on hold, call resource 12 terminates the call session to reclaim the processing resources.

Figure 2:
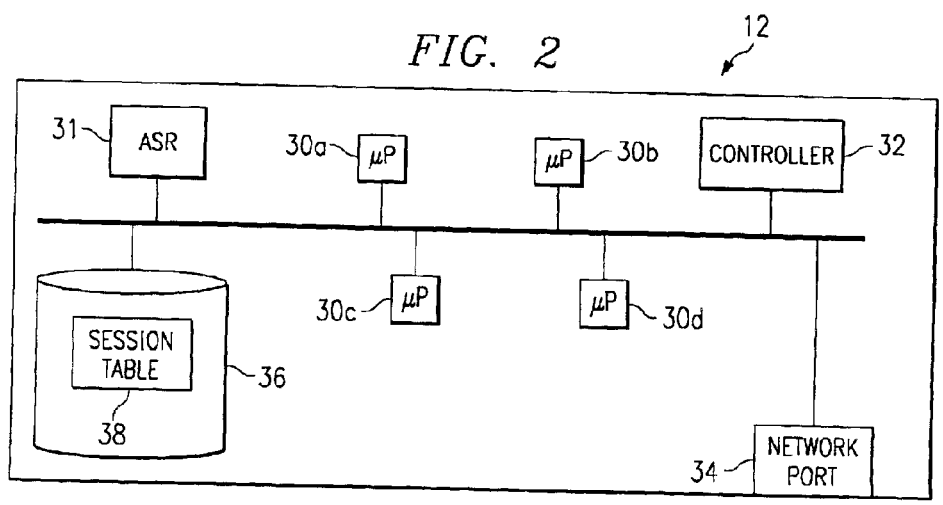
FIG. 2 illustrates a block diagram of a call resource.

FIG. 2 illustrates a block diagram of call resource 12. Call resource 12 includes media processors 30, ASR 31, controller 32, network port 34, and memory 36. Network port 34 communicates with network 20, and receives media streams from devices 16 and signaling information from call manager 14. Call resource 12 terminates a call session after call manager 12 loses contact with call resource 12 by detecting and deleting inactive media streams communicated from devices 16. In a particular embodiment, call resource 12 detects inactive media streams with ASR 31 by determining if user responses to prompts match desired words or phrases. When only one media stream remains active in the call session, call resource 12 deletes the one active media stream to terminate the call session and reclaim media processors 20 for use in another call session initiated by call manager 15.

Media processors 30 may exchange and mix media streams communicated from devices 16 via network 20. Media processors 30 may support the G.711 codec standard, the G.723 codec standard, the G.729 codec standard or any other standard capable of encoding audio information. The G.711 standard may transmit a data packet approximately every 10 ms to 30 ms; the G.723 standard may transmit a data packet approximately every 30 ms; and the G.729 standard may transmit a data packet approximately every 10 ms. Media processors 30 operate with controllers, microprocessors, and/or digital signal processing (DSP) resources and perform encoding, transcoding, compressing, decompressing, decoding, mixing, and other signal processing functions to control the call session. Media processors 30 receive media streams from devices 16, encode, decode, and/or transcode the media streams into a proper format, and generate a number of mixed media streams for communication back to devices 16.

In one embodiment, media processor 30a receives media streams from devices 16 participating in a call session. Media processor 30a uses suitable signal processing techniques to mix the media streams and produce mixed media streams for communication back to devices 16. Each device 16 participating in the call session may receive a mixed media stream that includes contribution from all other devices except itself. As an example, device 16 receives a mixed media stream that includes contributions from devices 18 and 22. Similarly, device 18 receives a mixed media stream including contributions from devices 16 and 22.

Controller 32 may provide overall control and management of multiple call sessions conducted using call resource 12. Specifically, controller 32 may provide administrative control, port assignment, admission control, media resource allocation, command generation and receipt, and any other activities to control the call session and direct media processors 30 to provide the appropriate signal processing. Controller 32 may direct the media streams to one of media processors 30 executing the call session between devices 16. Controller 32 may also receive signaling information for the call session from call manager 14. In the case where call manager 14 becomes unavailable, call resource 12 may receive signaling information from call manager 15.

ASR 31 performs adaptive speech recognition on user responses to prompts. In one embodiment, ASR 31 generates a prompt asking the users at endpoints of the media stream in the call session to provide a response indicating that they are active in the call session. If the response indicates the presence of the user, ASR 31 notifies controller 32 that the media stream is active. If the response does not indicate the presence of the user, ASR 31 notifies controller 32 that the media stream is inactive and may be deleted.

Memory 36 stores program instructions for execution by controller 32, and provides storage for session information in session table 38. Memory 36 may be any suitable form of a volatile or non-volatile memory that is integral or separate from call resource 12. Session table 38 may contain information for the call sessions being executed by media processors 30 in call resource 12. For example, session table 38 may store the number of endpoints in each call session, the addresses of the devices associated with each endpoint, remote on hold notifications received from any endpoint, and any other suitable information that may be used by controller 32 to manage and control the call session.

When call manager 14 loses contact with call resource 12, controller 32 may detect that signaling information for the call sessions being hosted by media processors 30 is not being received on network port 34. In one embodiment, one media stream remains in the call session and call manager 14 loses contact with call resource 12. Call resource 12 may detect that there is one active media stream in the call session and play a prompt to a user at an endpoint of the active media stream indicating that the call session is being terminated. Following the prompt, call resource 12 deletes the active media stream and media processors 30 become available to host other call sessions initiated by call manager 15.

In another embodiment, network 20 may be a packet-based network, such as an IP network, that supports communication using the real-time transport protocol (RTP). RTP provides end-to-end delivery services for media and includes data type identification, sequence numbers, timestamping, and delivery monitoring. Each RTP packet within a media stream contains a header that provides timing information and a sequence number that allows the destination device to reconstruct the timing produced by the source device.

Devices 16 may also support the real-time transport control protocol (RTCP), which monitors the quality of service (QoS) and conveys information about devices 16 during the call session. For example, an RTCP packet may contain the amount of jitter between RTP packets over network 20 and how many RTP packets have been dropped during a specific amount of time. An RTCP packet may also provide a "heartbeat" for the call session that indicates devices 16 are participating in the call session and call manager 14 is communicating with devices 16 and call resource 12.

If devices 16 support RTCP, call resource 12 detects if an RTCP packet has been received from a media stream within a specific time interval. Call resource 12 determines that the media stream is inactive if no RTCP packets are received during the specific time interval and deletes the inactive media stream from the call session. Call resource 12 repeats this process until one media stream remains in the call session. Call resource 12 plays a prompt to a user at an endpoint of the one media stream that the call session is being terminate and deletes the one media stream to reclaim media processors 30.

In a further embodiment, network 20 supports RTP with voice activity detection (VAD), but devices 16 do not support RTCP. VAD detects periods of silence when a user at the endpoint of a media stream is quiet, and suppresses the transmission of packets during these periods to preserve network resources. When VAD detects a sufficiently long period of silence, a silence insertion descriptor (SID) packet is sent to call resource 12 to indicate that no RTP packets will be transmitted from device 16 because a user at an endpoint of the media stream is silent.

If call resource 12 detects silence on a media stream in the call session but has not received a SID packet prior to losing the ability to receive signaling from call manager 14, call resource 12 determines that the media stream is inactive and deletes the inactive media stream from the call session. If call resource 12 detects silence on the media stream and receives a SID packet prior to losing the ability to receive signaling from call manager 14, the inactivity on the media stream may be due to silence. In this case, call resource 12 prompts the user at the endpoint of the media stream to speak and indicate if the user is actively participating in the call session. If the user responds to the prompt by speaking or sending in-band data, the voice activity or in-band data will generate RTP packets that may be detected by call resource 12. In a particular embodiment, the prompt may request the user to respond by speaking rather than pressing a button on devices 16 because a signal generated by pressing a button, such as a digit on a touch tone phone, may generate an out-of-band signal that is unavailable to media processors 30 in call resource 12. In this case, ASR 31 analyzes the user response.

In a further embodiment, network 20 supports RTP without VAD and devices 16 do not support RTCP. Since VAD is not supported, RTP packets are communicated from devices 16 even if a user at an endpoint of a media stream is silent. In this case, call resource 12 analyzes the RTP packets to determine if they indicate voice activity. If the RTP packets indicate voice activity, call resource 12 maintains the call session unless there is only one active media stream in the call session. Call resource 12 then deletes the one active media stream and terminates the call session. If the RTP packets do not indicate voice activity, call resource 12 plays a prompt asking a user at an endpoint of the media stream to speak and indicate that the user is an active participant in the call session. In one embodiment, ASR 31 verifies that the endpoint is participating in the call session by performing speech recognition on the user response. If the user speaks within a given time interval, call resource 12 detects voice activity in the RTP packets and continues the call session. In one embodiment, the time interval may be approximately three to five seconds, or any other suitable time interval that allows the user to speak a response to the prompt. If the user does not speak within the time interval, the received RTP packets do not indicate voice activity and call resource 12 determines that the media stream is inactive. Call resource 12 then deletes the inactive media stream and recovers resources of media processors 30 for use in another call session.

Figure 3A:
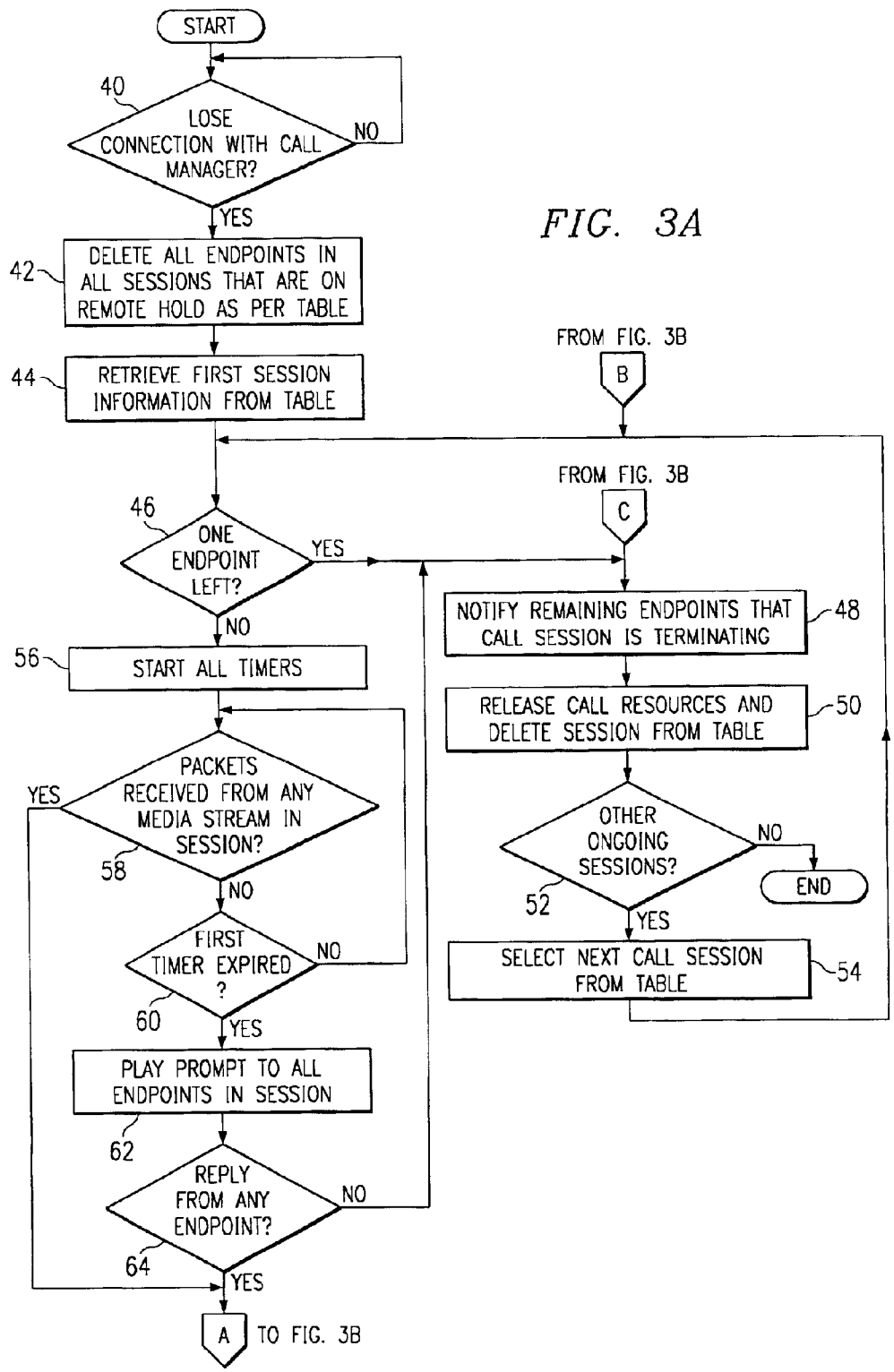
FIGS. 3A and 3B illustrate a flowchart of a method for recovering the call resource from the call session.
Figure 3B:
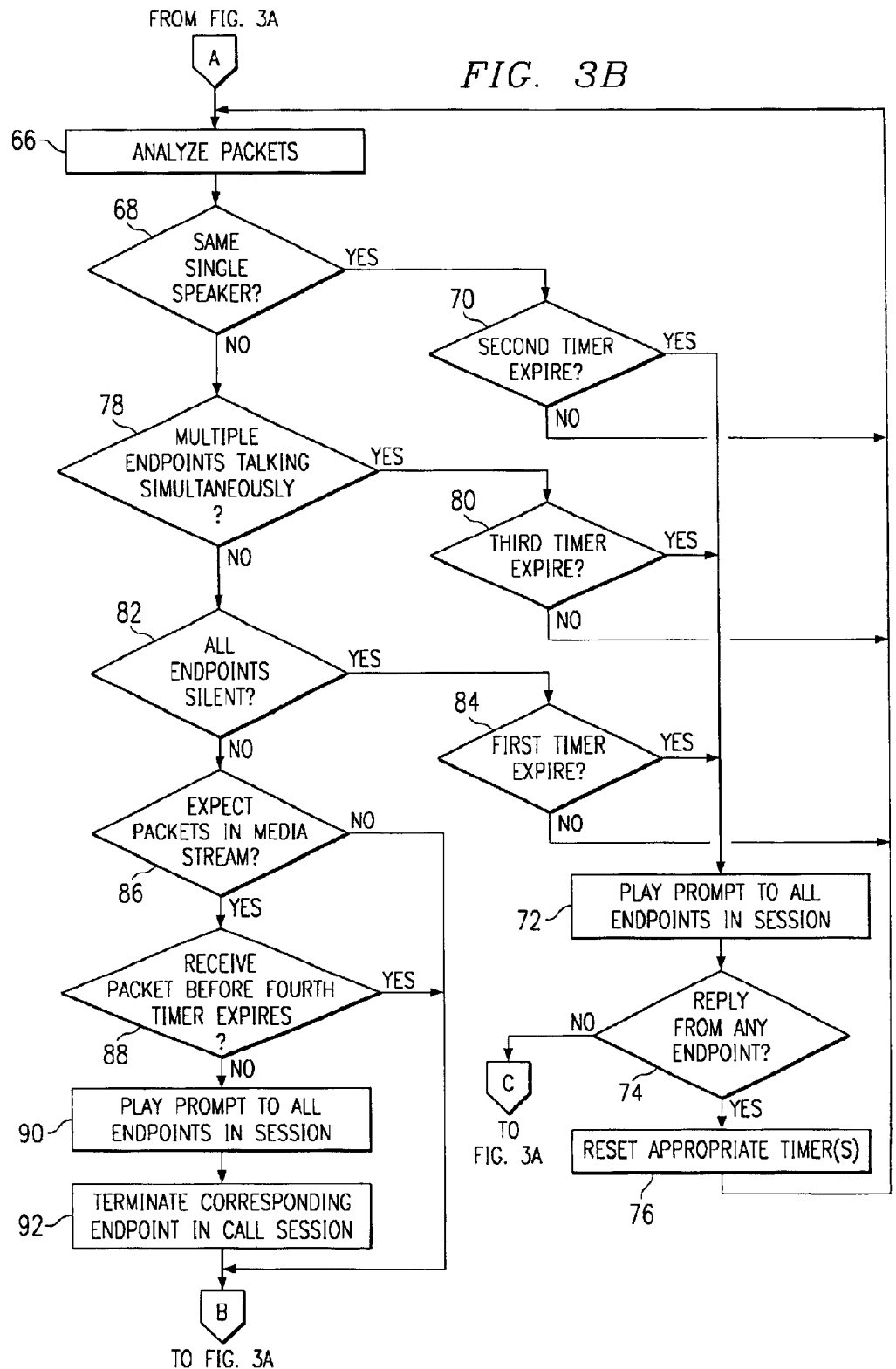

FIGS. 3A and 3B illustrate a flowchart of a method for recovering call resource 12 from a call session. Generally, upon call manager 12 becoming unavailable, call resource 12 detects if each media stream in the call session becomes inactive during the call session. Call resource 12 detects inactivity by using timers associated with media and/or control packets, and/or user responses from each media stream. If one timer or a combination of more than one timer associated with a media stream expires and the associated packets or user responses have not been received, call resource 12 deletes the media stream from the call session. Call resource 12 detects inactive media streams and deletes the inactive media streams from the call session until one media stream remains in the call session. When call resource 12 detects the one remaining media stream, call resource 12 notifies a user at an endpoint of the one media stream that the call session is being terminated, deletes the one media stream, and releases the media processor from the call session. Throughout this description, the term endpoint may refer to devices 16, addresses of devices 16, and/or media streams associated with devices 16.

As shown at step 40, call resource 12 determines if the connection with call manager 14 has been lost or has terminated. Call manager 14 may lose contact with the call session due to malfunction, network problems, or other circumstance. If call resource 12 loses the ability to receive signaling due to losing contact with call manager 14, controller 32 in call resource 12 accesses session table 38 in memory 36 to obtain information about the call sessions being executed on media processors 30 and deletes the endpoints in the call sessions that are on hold at step 42. In one embodiment, call manager 14 sends a remote on hold notification to call resource 12 for each of devices 16 that are on hold in the call sessions executed by media processors 30. Controller 32 receives the notification and stores the information in session table 38. After call manager 14 loses contact with the call session, controller 32 accesses session table 38 and deletes any endpoints in the call sessions for which a remote on hold notification was received.

Once call resource 12 deletes the endpoints in all call sessions that are on remote hold, call resource 12 retrieves information for one of the call sessions being executed on media processors 30 at step 44. The retrieved information may include the number of endpoints remaining in the session, the IP addresses for the endpoints, and any suitable information that may allow call resource 12 to determine if the endpoints in the call session are inactive.

At step 46, if call resource 12 determines that only one endpoint remains active in the call session, call resource 12 notifies the user at the remaining endpoint that the call session is terminating at step 48. Call resource 12 then releases the media processor conducting the call session and deletes the call session from session table 38 at step 50. Call resource 12 determines if there are any other call sessions being executed by media processors 30 at step 52. If there are other ongoing call sessions, call resource 12 selects another call session and retrieves information for the call session from session table 38 at step 54. If there are no ongoing call sessions, the process ends and media processors 30 in call resource 12 become available to conduct future call sessions initiated by call manager 15.

If call resource 12 determines that more than one endpoint in the selected call session remains active at step 46, call resource 12 initiates one or more suitable timers at step 56. Although the description includes multiple timers, system 10 can use one or any combination of timers to detect inactive endpoints. In one embodiment, the timers may be associated with the receipt of packets at call resource 12, or a user response to a prompt. At step 58, call resource 12 determines if at least one packet has been received from any active endpoint in the call session. If no packets have been received after call resource 12 initiates the timers, call resource 12 determines if a first timer has expired at step 60. In one embodiment, the first timer may be associated with the reception of any packet, from any of the active endpoints in the selected call session. The length of the timer may be approximately three minutes or any other suitable time for determining if call resource 12 received at least one packet from any of the active endpoints.

If the first timer has not expired, call resource 12 continues to check if any packets have been received from any of the active endpoints at step 58. If the first timer expires before at least one packet has been received, call resource 12 plays a prompt to all active endpoints in the call session at step 62. For example, the prompt may ask the users at the endpoints to speak or to press a key to indicate that they are still participating in the call session. In one embodiment, the user response may be analyzed by ASR 31 which performs speech recognition to determine if the endpoints are active. If call resource 12 does not receive a reply from any of the active endpoints, call resource 12 returns to step 48 to release the appropriate media processors from the call session.

If call resource 12 receives a reply to a prompt or receives at least one packet from at least one of the active endpoints, controller 32 analyzes the packets received from the endpoints at step 66. If controller 32 determines that a single endpoint is continuously generating the received packets at step 68, call resource 12 checks a second timer to determine if it has expired at step 70. For example, the single endpoint may be playing music while the device is placed on hold or a user at the endpoint may be lecturing to users at the other active endpoints. In one embodiment, the length of the second timer may be between approximately two and three hours, or any other appropriate time for determining if only one endpoint is continuously generating packets. If the second timer has not expired, controller 32 continues to analyze the received packets from the active endpoints in the call session at step 66. If the second timer has expired, call resource 12 plays a prompt to all active endpoints in the call session asking the users at the endpoints to respond to the prompt at step 72. If call resource 12 receives a reply from any of the endpoints at step 74, call resource 12 resets the second timer at step 76, and returns to step 66 to analyze the received packets. If call resource 12 does not receive a reply from any of the endpoints, call resource 12 returns to step 48 to release the appropriate media processors for use in call session initiated by call manager 15.

If call resource 12 determines that a single speaker is not generating all of the received packets at step 68, call resource 12 determines if multiple endpoints are generating packets continuously and simultaneously at step 78. For example, two or more endpoints may be continuously playing music on hold and generating media packets. If call resource 12 determines that at least two endpoints are continuously generating packets, call resource 12 checks a third timer to determine if it has expired at step 80. The length of the third timer may be approximately ten minutes, or any other appropriate time to determine if at least two endpoints are simultaneously and continuously generating media packets during the selected call session. If the third timer has not expired, call resource 12 continues to analyze the received packets from the active endpoints in the call session at step 66. If the third timer has expired, call resource 12 plays a prompt to all active endpoints in the call session asking the users at the endpoints to respond to the prompt at step 72. If call resource 12 receives a reply from any of the endpoints at step 74, call resource 12 resets the third timer at step 76 and returns to step 66 to analyze the received packets. If call resource does not receive a reply from any of the endpoints, call resource 12 returns to step 48 to release the appropriate media processors from the call session for use in other call sessions initiated by call manager 15.

If call resource determines that all active endpoints in the call session are silent at step 82, call resource 12 checks the first timer to see if it has expired at step 84. If the first timer has not expired, controller 32 continues to analyze the received packets from the active endpoints in the call session at step 66. If the first timer has expired, call resource 12 plays a prompt to all active endpoints in the call session asking the users at the endpoints to respond to the prompt at step 72. If call resource 12 receives a reply from any of the endpoints at step 74, call resource 12 resets the first timer at step 76 and returns to step 66 to analyze the received packets. If call resource 12 does not receive a reply from any of the endpoints, call resource 12 returns to step 48 to release the appropriate media processors for use in future call sessions initiated by call manger 15.

Call resource 12 examines each active endpoint in the selected call session to determine if the media stream associated with each endpoint should contain packets at step 86. If the media stream should not contain any packets, call resource 12 returns to step 46 to determine if only one endpoint remains active in the call session. In one embodiment, at least one of the active endpoints supports VAD. In this case, the media stream should contain no packets if call resource 12 previously received a SID packet. The SID packet indicates that the endpoint is active in the call session, but that the user at the endpoint is silent. If call resource 12 determines that the media stream should contain packets at step 86, call resource 12 determines if a packet has been received before a fourth timer expires at step 88. In one embodiment, call resource 12 may expect a packet if the endpoint supports RTCP. The length of the fourth timer may be set based on an RTCP heartbeat packet expected from devices 16. If call resource 12 receives a packet before the fourth timer expires, call resource 12 returns to step 46 to determine if only one endpoint remains active in the call session.

If call resource 12 expects but does not receive a packet from an endpoint before the fourth timer expires, call resource 12 plays a prompt indicating that the media stream associated with the endpoint is being terminated at step 90. Call resource then terminates the endpoint in the call session and removes the endpoint from session table 38 at step 92, and returns to step 46 to determine if there is only one active endpoint remaining in the call session.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for recovering a call resource from a call session, comprising:
   during a call session comprising a plurality of media streams each communicated from one of a plurality of devices to a call resource via a communication network, detecting if one of the media streams becomes inactive;
   in response to one of the media streams becoming inactive during the call session, deleting the media stream that has become inactive from the call session;
   repeating detection and deletion of inactive media streams from the call session until only one media stream remains in the call session; and
   in response to only one media stream remaining in the call session, terminating the one remaining media stream to release the call resource from the call session.

2. The method of claim 1, further comprising:
   establishing the call session between the call resource and a plurality of devices using a call manager, the call session comprising a plurality of media streams communicated from the plurality of devices; and
   determining that the call manager has become unavailable.

3. The method of claim 2, further comprising:
   receiving signaling from an alternative call manager to establish a new call session; and
   establishing the new call session using the released call resource.

4. The method of claim 2, further comprising:
   receiving a remote on hold notification from at least one of the media streams in the call session; and
   deleting the at least one media stream associated with the remote on hold notification from the call session.

5. The method of claim 2, wherein detecting comprises prompting users at endpoints of the media streams to speak if packets are generated by only a single media stream for a predetermined amount of time.

6. The method of claim 2, wherein detecting comprises prompting users at endpoints of the media streams to speak if at least two media streams are simultaneously and continuously generating packets for a predetermined amount of time.

7. The method of claim 1, further comprising notifying a user at an endpoint of the one media stream that the call session is being terminated.

8. The method of claim 1, wherein detecting comprises:
   prompting a user at an endpoint of the media stream if one or more packets generated by the media stream indicate silence for a predetermined period of time; and
   receiving the one or more packets that indicate voice activity if the user speaks in response to the prompt.

9. The method of claim 1, wherein detecting comprises:
   detecting if the media stream supports voice activity detection (VAD);
   determining if the call resource received a silence insertion descriptor (SID) packet;
   prompting a user at an endpoint of the media stream to speak if a timer expires and the call resource received the SID packet; and
   receiving packets that indicate voice activity if the user speaks in response to the prompt.

10. The method of claim 1, wherein detecting comprises:
    detecting if the media stream supports voice activity detection (VAD);
    determining that the call resource did not receive a silence insertion descriptor (SID) packet; and
    playing a prompt to a user at an endpoint of the media stream indicating that the call session is terminating if the call resource did not receive at least one packet from the media stream.

11. The method of claim 1, wherein detecting comprises:
    prompting a user at an endpoint of the media stream to speak if the media stream is inactive; and
    comparing a user response to the prompt using adaptive speech recognition.

12. A call resource, comprising:
    a network port operable to communicate media streams between a plurality of devices in a call session;
    a media processor coupled to the network port, the media processor operable to conduct the call session; and
    a controller coupled to the network port, the controller operable to release the media processor from the call session if a call manager becomes unavailable and one device remains as a participant in the call session.

13. The call resource of claim 12, the media processor further operable to:
    receive the media streams from the devices;
    mix media streams from the devices to generate a plurality of mixed media streams; and
    communicate the mixed media streams to the devices.

14. The call resource of claim 13, wherein the media processor comprises a digital signal processor (DSP).

15. The call resource of claim 12, wherein the controller is further operable to:
receive signaling from an alternative call manager to establish a new call session; and
establish the new call session using the media processor.

16. The call resource of claim 12, wherein the controller is further operable to:
receive a remote on hold notification from at least one of the media streams in the call session; and
delete the at least one media stream associated with the remote on hold notification from the call session.

17. The call resource of claim 12, wherein the controller is further operable to notify a user at the one device that the call session is being terminated.

18. The call resource of claim 12, wherein the controller is further operable to:
prompt users at the devices if one or more packets indicate silence for a predetermined period of time; and
receive the one or more packets that indicate voice activity if the users speak in response to the prompt.

19. The call resource of claim 12, wherein the controller is further operable to:
detect if the media streams support voice activity detection (VAD);
determine if a silence insertion descriptor (SID) packet was received from each of the media streams;
prompt users at the devices to speak if a timer expires and the SID packet was received during the call session; and
receive packets that indicate voice activity if the users speak in response to the prompt.

20. The call resource of claim 12, wherein the controller is further operable to:
detect if the media streams support voice activity detection (VAD); and
determine if the call resource did not receive a silence insertion descriptor (SID) packet from each of the media streams; and
play a prompt to the users at the devices indicating that the call session is terminating if no packets were received from the media streams.

21. The call resource of claim 12, wherein the controller is further operable to prompt users at the devices to speak if packets are generated by only a single media stream for a predetermined amount of time.

22. The call resource of claim 12, wherein the controller is further operable to prompt users at the devices to speak if at least two media streams are simultaneously and continuously generating packets for a predetermined amount of time.

23. The call resource of claim 12, further comprising an adaptive speech recognition (ASR) unit operable to analyze a response received on a media stream, wherein the controller is further operable to maintain the call session based on the response.

24. A communication system, comprising:
a plurality of devices operable to couple to a packet-based network;
a call manager operable to couple to the packet-based network, the call manager further operable to manage a call session between the devices; and
a call resource operable to couple to the packet-based network, the call resource further operable to:
exchange a plurality of media streams between the devices participating in the call session; and
terminate the call session if the call manager becomes unavailable and one device remains as a participant in the call session.

25. The communication system of claim 24, wherein the call resource is further operable to maintain the call session after the call manager becomes unavailable.

26. The communication system of claim 24, wherein the call resource is further operable to:
receive a remote on hold notification from at least one of the media streams in the call session; and
delete the at least one media stream associated with the remote on hold notification from the call session.

27. The communication system of claim 24, wherein the call resource is further operable to notify a user at the one device that the call session is being terminated.

28. The communication system of claim 24, wherein the call resource is further operable to:
prompt users at the devices if one or more packets indicate silence for a predetermined period of time; and
detect voice activity in the one or more packets if the users speak in response to the prompt.

29. The communication system of claim 24, wherein the call resource is further operable to:
detect if the media streams support voice activity detection (VAD);
determine if a silence insertion descriptor (SID) packet was received from each of the media streams;
prompt users at the devices to speak if a timer expires and the SID packet was received during the call session; and
detect voice activity in one or more packets if the users speak in response to the prompt.

30. The communication system of claim 24, wherein the call resource is further operable to:
detect if the media streams support voice activity detection (VAD);
determine if a silence insertion descriptor (SID)) packet was not received from each of the media streams; and
play a prompt to the users at the devices indicating that the call session is terminating if no packets were received from the media streams.

31. The communication system of claim 24, wherein the call resource is further operable to prompt users at the devices to speak if packets are generated by only a single media stream for a predetermine amount of time.

32. The communication system of claim 24, wherein the call resource if further operable to prompt users at the devices to speak if at least two media streams are simultaneously and continuously generating packets for a predetermined amount of time.

33. The communication system of claim 24, wherein the call resource is the further operable to:
detect if the media streams become inactive during the call session;
prompt users at the devices to speak if the media streams are inactive; and
analyze the user responses to the prompt using adaptive speech recognition (ASR).

34. Logic encoded in media for recovering a call resource from a call session and operable to perform the following steps:
during a call session comprising a plurality of media streams each communicated from one of a plurality of devices to a call resource via a communication network, detecting if one of the media streams becomes inactive;

in response to one of the media streams becoming inactive during the call session, deleting the media stream that has become inactive from the call session;

repeating detection and deletion of inactive media streams from the call session until only one media stream remains in the call session; and in response to only one media stream remaining in the call session, terminating the one remaining media stream to release the call resource from the call session.

35. The logic encoded in media of claim 34, further comprising:

establishing the call session between the call resource and a plurality of devices using a call manager, the call session comprising a plurality of media streams communicated from the plurality of devices; and determining that the call manager has become unavailable.

36. The logic encoded in media of claim 35, further comprising:

receiving signaling from an alternative call manager to establish a new call session; and establishing the new call session using the released call resource.

37. The logic encoded in media of claim 35, further comprising:

receiving a remote on hold notification from at least one of the media streams in the call session; and deleting the at least one media stream associated with the remote on hold notification from the call session.

38. The logic encoded in media of claim 35, wherein detecting comprises prompting users at endpoints of the media streams to speak if packets are generated by only a single media stream for a predetermined amount of time.

39. The logic encoded in media of claim 35, wherein detecting comprises prompting users at endpoints of the media streams to speak if at least two media streams are simultaneously and continuously generating packets for a predetermined amount of time.

40. The logic encoded in media of claim 35, further comprising notifying a user at an endpoint of the one media stream that the call session is being terminated.

41. The logic encoded in media of claim 34, wherein detecting comprises:

prompting a user at an endpoint of the media stream if one or more packets generated by the media stream indicate silence for a predetermined period of time; and receiving the one or more packets that indicate voice activity if the user speaks in response to the prompt.

42. The logic encoded in media of claim 34, wherein detecting comprises:

detecting if the media stream supports voice activity detection (VAD);

determining if the call resource received a silence insertion descriptor (SID) packet;

prompting a user at an endpoint of the media stream to speak if a timer expires and the call resource received the SID packet; and receiving packets that indicate voice activity if the user speaks in response to the prompt.

43. The logic encoded in media of claim 34, wherein detecting comprises:

detecting if the media stream supports voice activity detection (VAD);

determining that the call resource did not receive a silence insertion descriptor (SID) packet; and playing a prompt to a user at an endpoint of the media stream indicating that the call session is terminating if the call resource did not receive at least one packet from the media stream.

44. The logic encoded in media of claim 34, wherein detecting comprises:

prompting a user at an endpoint of the media stream to speak if the media stream is inactive; and analyzing a response using adaptive speech recognition (ASR).

45. An apparatus for recovering a call resource from a call session, comprising:

means for, during a call session comprising a plurality of media streams each communicated from one of a plurality of devices to a call resource via a communication network, detecting if one of the media streams becomes inactive;

means for, in response to one of the media streams becoming inactive during the call session, deleting the media stream that has become inactive from the call session;

means for repeating detection and deletion of inactive media streams from the call session until only one media stream remains in the call session; and means for, in response to only one media stream remaining in the call session, terminating the one remaining media stream to release the call resource from the call session.

46. The apparatus of claim 45, further comprising:

means for establishing the call session between the call resource and a plurality of devices using a call manager, the call session comprising a plurality of media streams communicated from the plurality of devices;

means for determining that the call manager has become unavailable;

means for receiving signaling from an alternative call manager to establish a new call session; and means for establishing the new call session using the released call resource.

47. The apparatus of claim 45, wherein the means for detecting comprises:

means for prompting a user at an endpoint of the media stream if one or more packets generated by the media stream indicate silence for a predetermined period of time; and means for receiving the one or more packets that indicate voice activity if the user speaks in response to the prompt.

48. The apparatus of claim 45, wherein detecting comprises:

prompting a user at an endpoint of the media stream to speak if the media stream is inactive; and analyzing a response using adaptive speech recognition (ASR).

* * * * *

UNITED STATES PATENT AND TRADEMARK OFFICE
CERTIFICATE OF CORRECTION

PATENT NO. : 6,917,587 B1
APPLICATION NO. : 09/776076
DATED : July 12, 2005
INVENTOR(S) : Sarkar et al.

It is certified that error appears in the above-identified patent and that said Letters Patent is hereby corrected as shown below:

Column 14, Line 56, Claim 33, after "is", delete "the".

Signed and Sealed this

Twenty-first Day of November, 2006

JON W. DUDAS
*Director of the United States Patent and Trademark Office*